Dec. 2, 1930.                H. A. UNKE                1,783,893
                          PIPE END PROTECTOR
                          Filed Nov. 23, 1928

Inventor
Herman A. Unke.
Kwis Hudson + Kent
Attys.

Patented Dec. 2, 1930

1,783,893

UNITED STATES PATENT OFFICE

HERMAN A. UNKE, OF CLEVELAND, OHIO

PIPE-END PROTECTOR

Application filed November 23, 1928. Serial No. 321,319.

This invention relates to devices for protecting the ends of pipes or conduits against damage or distortion while they are being handled and shipped.

It is one of the objects of this invention to provide an improved form of protector that can be manufactured at low cost and adapted to be readily placed in position over the end of a pipe, and which is not likely to be jarred or knocked loose while the pipe is being handled.

Other objects and advantages of the invention will be apparent from the following description taken in connection with the accompanying drawings, of which:

Figure 1:
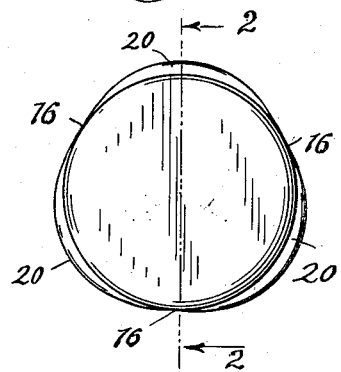
Figure 1 is an end view of a protector embodying my invention.
Figure 2:
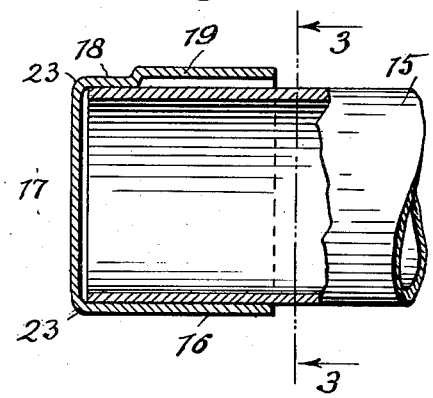
Fig. 2 is a sectional view, taken on line 2—2 of Fig. 1, showing the protector fitted to the end of a length of pipe.
Figure 4:
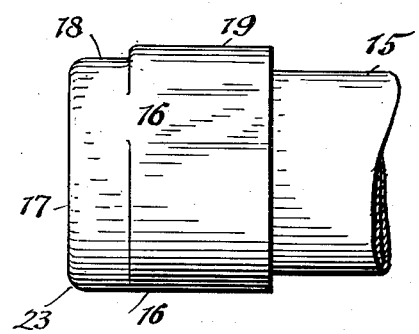
Fig. 4 is a side elevation showing the end portion of a length of pipe with my protector arranged thereon.

Referring now to the drawings in detail, Figs. 2 and 4 show the end portion of a length of pipe or conduit, designated 15, upon which my protector 16 is arranged. The protector of my invention is intended for use as a protective covering for the unthreaded ends of pipes and conduits in general, and especially for protecting the ends of relatively thin walled pipes and conduits against damage and distortion during shipping and handling. The protector is preferably formed from sheet metal by stamping or drawing dies, and, as shown in the drawings, comprises a cap or cup shaped shell which fits over the end of the pipe or article to be protected. In the forming or drawing operation the central portion of the blank forms the end or web 17 of the cap, while other portions of the blank are flanged or turned over to form the annular flange 18 and the sleeve or extension 19 coaxial therewith. In constructing the protector of my invention the web 17 may, if desired, be made as an imperforate wall as herein illustrated.

Figure 3:
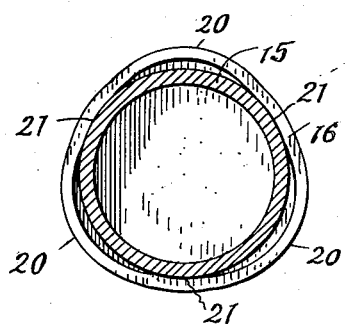
Fig. 3 is a cross section taken on line 3—3 of Fig. 2.

For holding the protector on the end of the pipe I prefer to make the sleeve 19 of non-circular form, as shown in Fig. 3, so as to frictionally engage the wall of the pipe at spaced points only when the protector is arranged thereon. I accomplish this result by bulging the wall of sleeve 19 outwardly at spaced points to form the lobes 20. By making the sleeve 19 of non-cylindrical form it becomes more resilient so that when the protector is forced on the pipe, the pipe tends to spring the sleeve back into cylindrical shape with the result that the sleeve will firmly engage the wall of the pipe at points intermediate the lobes 20, as indicated at 21.

In order to properly center the protector on the pipe, the annular flange 18 is made with its internal diameter slightly smaller than the external diameter of the pipe on which the protector is to be used, so as to provide a tight fit which for convenience I will call a drive fit between the flange 18 and the wall of the pipe. This drive fit not only insures proper centering of the protector, but assists greatly in securing the protector on the pipe.

The protector is driven or pressed on the end of the pipe and the frictional engagement therebetween is sufficient to hold the protector in place without danger of its being jarred loose, and yet, permits the protector to be easily removed when desired without injury to the pipe. The rounded edge 23 protects the wall of the pipe from being distorted by blows received end-on, while the flange 18 and the sleeve 19, of which the metal has been made harder and more resilient incidental to the working thereof, prevent collapse or distortion of the wall of the pipe.

While I have shown and described the preferred form of my device, it will be understood that I do not limit my invention to this particular embodiment, but regard as my invention such modifications thereof as fall within the scope of the appended claims.

Having described my invention, I claim:

1. A pipe end protector comprising a metallic cap having a cylindrical skirt portion adapted to form a drive fit with the end portion of a pipe and having a resilient sleeve extension formed with spaced outwardly bulging lobes and adapted to frictionally engage the wall of said pipe at points intermediate said lobes.

2. A pipe end protector stamped from sheet metal and comprising a web having an annular flange adapted to form a drive fit with the end portion of a pipe, and an extension on said flange coaxial therewith formed with spaced outwardly bulging lobes and adapted to frictionally engage the wall of said pipe at points intermediate said lobes.

3. A pipe end protector stamped from sheet metal and comprising a web having an annular flange adapted to form a drive fit with the end portion of a pipe and to center the protector thereon, and a resilient extension of non-cylindrical form carried by said flange for frictionally engaging the wall of said pipe at spaced points.

4. A pipe end protector formed from sheet metal and comprising a sleeve portion of non-cylindrical form adapted to be slipped over the end of a pipe and to frictionally engage the wall thereof at spaced points, and a cap portion having an annular flange integrally connected to one end of said sleeve, said annular flange being adapted to form a drive fit with the end portion of said pipe.

5. A protector for the end portion of a tubular member comprising a metallic cap having a cylindrical portion and an integral non-cylindrical portion coaxial with said cylindrical portion, said non-cylindrical portion being adapted to resiliently engage the wall of said tubular member at spaced points only and said cylindrical portion being formed with an internal diameter slightly smaller than the external diameter of the tubular member whereby said cylindrical portion forms a tight fit with the tubular member when the protector is applied thereto.

In testimony whereof, I hereunto affix my signature.

HERMAN A. UNKE.